US007181214B1

(12) United States Patent
White

(10) Patent No.: US 7,181,214 B1
(45) Date of Patent: Feb. 20, 2007

(54) SYSTEM AND METHOD FOR DETERMINING THE MEASURE OF MOBILITY OF A SUBSCRIBER DEVICE IN AN AD-HOC WIRELESS NETWORK WITH FIXED WIRELESS ROUTERS AND WIDE AREA NETWORK (WAN) ACCESS POINTS

(75) Inventor: Eric D. White, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 747 days.

(21) Appl. No.: 09/987,102

(22) Filed: Nov. 13, 2001

(51) Int. Cl.
*H04Q 7/20* (2006.01)
*H04M 1/00* (2006.01)
*H04B 7/00* (2006.01)

(52) U.S. Cl. .............................. 455/435.1; 455/435.2; 455/435.3; 455/517; 455/552.1; 370/310.2; 370/328; 370/331

(58) Field of Classification Search ............. 370/310.2, 370/328, 331; 455/517, 575, 553.1, 552.1, 455/554.1, 455.1, 435.2, 435.3
See application file for complete search history.

(56) References Cited

U.S. PATENT DOCUMENTS

| 4,494,192 A | 1/1985 | Lew et al. ................. 364/200 |
| 4,617,656 A | 10/1986 | Kobayashi et al. ........... 370/74 |
| 4,736,371 A | 4/1988 | Tejima et al. ................. 370/95 |
| 4,742,357 A | 5/1988 | Rackley ....................... 342/457 |
| 4,747,130 A | 5/1988 | Ho ............................... 379/269 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Matthew D. Anderson
*Assistant Examiner*—Yuwen Pan
(74) *Attorney, Agent, or Firm*—Randi L. Karpinia; Joseph J. Buczynski

(57) ABSTRACT

A system and method for determining the mobility of a node in a network, such as a wireless ad-hoc network that requires the node to share its information with other mobile and stationary nodes, such as fixed wireless routers and intelligent access points, so that the rate at which the node shares this information and receives location information, such as Geo-location updates, could be based on the rate of mobility of the node. The node includes a transceiver which is adapted to communicate or attempt to communicate with at least one of the stationary other nodes in the network, and a controller which is adapted to determine a mobility factor of the node based on the communication or attempted communication with the at least one stationary other node. The controller is further adapted to control a rate at which the transceiver sends information pertaining to the node to at least one of the other nodes in the network based on the mobility factor. The mobility factor represents a rate of mobility of the node, and the rate at which the controller controls the transceiver to send the information is proportional to the rate of mobility.

24 Claims, 3 Drawing Sheets

U.S. PATENT DOCUMENTS

| | | | |
|---|---|---|---|
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,727 A | 8/1998 | Harrison et al. | |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,134,587 A * | 10/2000 | Okanoue | 709/222 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,535,498 B1 * | 3/2003 | Larsson et al. | 370/338 |
| 2001/0024953 A1 | 9/2001 | Balogh | |
| 2001/0028313 A1 | 10/2001 | McDonnell et al. | |
| 2001/0053699 A1 | 12/2001 | McCrady et al. | 455/513 |
| 2003/0224787 A1 * | 12/2003 | Gandolfo | 455/434 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al. "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

"OSPF Version 2", Apr. 1998, Internet RFC/STD/FYI/BCP Archives.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kammerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking WIth Adaptive Link Control and Tactical Multi-Channel Software Radios".

* cited by examiner

SYSTEM AND METHOD FOR DETERMINING THE MEASURE OF MOBILITY OF A SUBSCRIBER DEVICE IN AN AD-HOC WIRELESS NETWORK WITH FIXED WIRELESS ROUTERS AND WIDE AREA NETWORK (WAN) ACCESS POINTS

BACKGROUND OF THE INVENTION

1. Field of the Invention

The present invention relates to a system and method for determining the measure of mobility of a subscriber device in an ad-hoc wireless network with fixed wireless routers and wide area network (WAN) access points. More particularly, the present invention relates to a system and method capable of determining the mobility of a node in a network, such as a wireless ad-hoc network that requires the node to share its information with other nodes, so that the rate at which the node shares this information could be based on the rate of mobility of the node, to thus enable the nodes to share their information with other nodes more economically from a bandwidth usage standpoint.

2. Description of the Related Art

In recent years, a type of mobile communications network known as an "ad-hoc" network has been developed for use by the military. In this type of network, each user terminal is capable of operating as a base station or router for the other user terminals, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling user terminals (mobile nodes) to communicate with each other as in a conventional ad-hoc network, include intelligent access points (IAPs) that further enable the nodes to access a fixed network and thus communicate with other user terminals, such as those on the public switched telephone network (PSTN), and on other networks such as the Internet. Details of these types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, and in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, the entire content of both of said patent applications being incorporated herein by reference.

As described in the patent applications referenced above, each mobile node in the ad-hoc network communicates its routing table information to its neighboring mobile nodes and stationary nodes, such as fixed wireless routers or IAPs, within its radio frequency (RF) range, to inform those neighboring nodes of, for example, its neighboring nodes, the IAP with which it is affiliated, and its ability to operate as a router. For instance, if a mobile node's battery or power supply begins to become exhausted, the person using the mobile node may want his or her mobile node to cease operating as a router, or to only operate as a router if no other suitable router is available, to conserve battery power, as described in U.S. Pat. No. 6,873,839 entitled "Prioritized-Routing for an Ad-Hoc, Peer-to-Peer, Mobile Radio Access System", issued on Mar. 29, 2005, the entire content of which is incorporated herein by reference.

When a mobile node broadcasts its routing table to the other nodes within its radio frequency (RF) range, each of those other nodes store all or a relevant portion of this routing table information in their respective memory. Hence, the respective controllers in the nodes can determine whether to route packetized data to a particular node based on, for example, the node's neighboring nodes, the condition of the battery of that particular node, and so on. The ability of the mobile and fixed nodes (referred to generally as "nodes") to broadcast this routing information to other mobile nodes enable the mobile nodes to make possible the "self-healing" characteristics of an ad-hoc network as described, for example, in U.S. Pat. No. 5,943,322 to Mayor and in U.S. Pat. Nos. 7,072,650, 6,807,165 and 6,873,839, referenced above.

As can be appreciated from the above, due to the mobility of the mobile nodes in the wireless ad-hoc network, their neighboring nodes, as well as their affiliation with IAPs, change from time to time. That is, in a fixed or non-mobile data network (wireless or wired), the sharing of routing information is simple due to the fact that the only time the information changes is when a node is removed from the network. However, in an ad-hoc wireless network of the type described above, the mechanism for finding nodes, and determining how to route packets to these nodes, becomes more difficult. For example, due to the constant changes in the locations of the mobile nodes that are moving, it becomes difficult for the mobile nodes and their neighboring nodes to continuously share and update their routing table information with each other. In order to share this change information, large amounts of information must be exchanged to facilitate the updating of each node's view of the network topology to maintain routing decisions as up to date as possible. The more mobile the network is, the more frequently this data must be exchanged between nodes, thus requiring consumption of large amounts of the available bandwidth.

However, as can be appreciated from the above, if the network were capable of determining the mobility of its mobile nodes, that is, how frequently any node is changing its neighboring nodes and its affiliation with an IAP due to its movement, the rate that node shares its information, such as location and routing table information, with other nodes (i.e., mobile node, fixed wireless routers and IAPs) can be set more commensurate to the node's movement. That is, if the node is moving frequently or rapidly, the node should share its information with other nodes more frequently, because this information is changing more frequently. Also, the rate at which the node needs to perform Geo-location updates that enables it to determine its own location, can be set to be more proportionate to the node's mobility. However, if a node is stationary, such as in a home or office, the node need not share its information with the other nodes very often, because such information remains basically the same, nor need it perform Geo-location updates.

Accordingly, a need exists for a system and method capable of determining the mobility of a node in a network, such as a wireless ad-hoc network that requires the node to share its information with other nodes, so that the rate at which the node shares this information could be based on the rate of mobility of the node, to thus enable the nodes to share their information with other nodes more economically from a bandwidth usage standpoint.

SUMMARY OF THE INVENTION

An object of the present invention is to provide a system and method for determining the measure of mobility of a subscriber device in an ad-hoc wireless network with fixed wireless routers and wide area network (WAN) access points.

Another object of the present invention is to provide a system and method capable of determining the mobility of a node in a network, such as a wireless ad-hoc network that requires the node to share its information with other nodes, so that the rate at which the node shares this information and performs Geo-location updates, could be based on the rate of mobility of the node.

These and other objects are substantially achieved by providing a node, which is adapted for use in a wireless communications network, such as a wireless ad-hoc network, and which is capable of determining its mobility. The wireless communications network comprises a plurality of other nodes, at least some of which are stationary, such as fixed wireless routers or fixed access points to a portion of the network or another network. The node includes a transceiver which is adapted to communicate or attempt to communicate with at least one of the stationary other nodes in the network, and a controller which is adapted to determine a mobility factor of the node based on the communication or attempted communication with the at least one stationary other node. The communication by the transceiver with the at least one other stationary node enables the node to determine its distance to the at least one other stationary node, and the attempted communication by the transceiver with the at least one other stationary node enables the node to determine whether the at least one other stationary node is a within a transmission range of the node. The controller is further adapted to control a rate at which the transceiver sends information pertaining to the node to at least one of the other nodes in the network based on the mobility factor. The mobility factor represents a rate of mobility of the node, and the rate at which the controller controls the transceiver to send the information is proportional to the rate of mobility.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
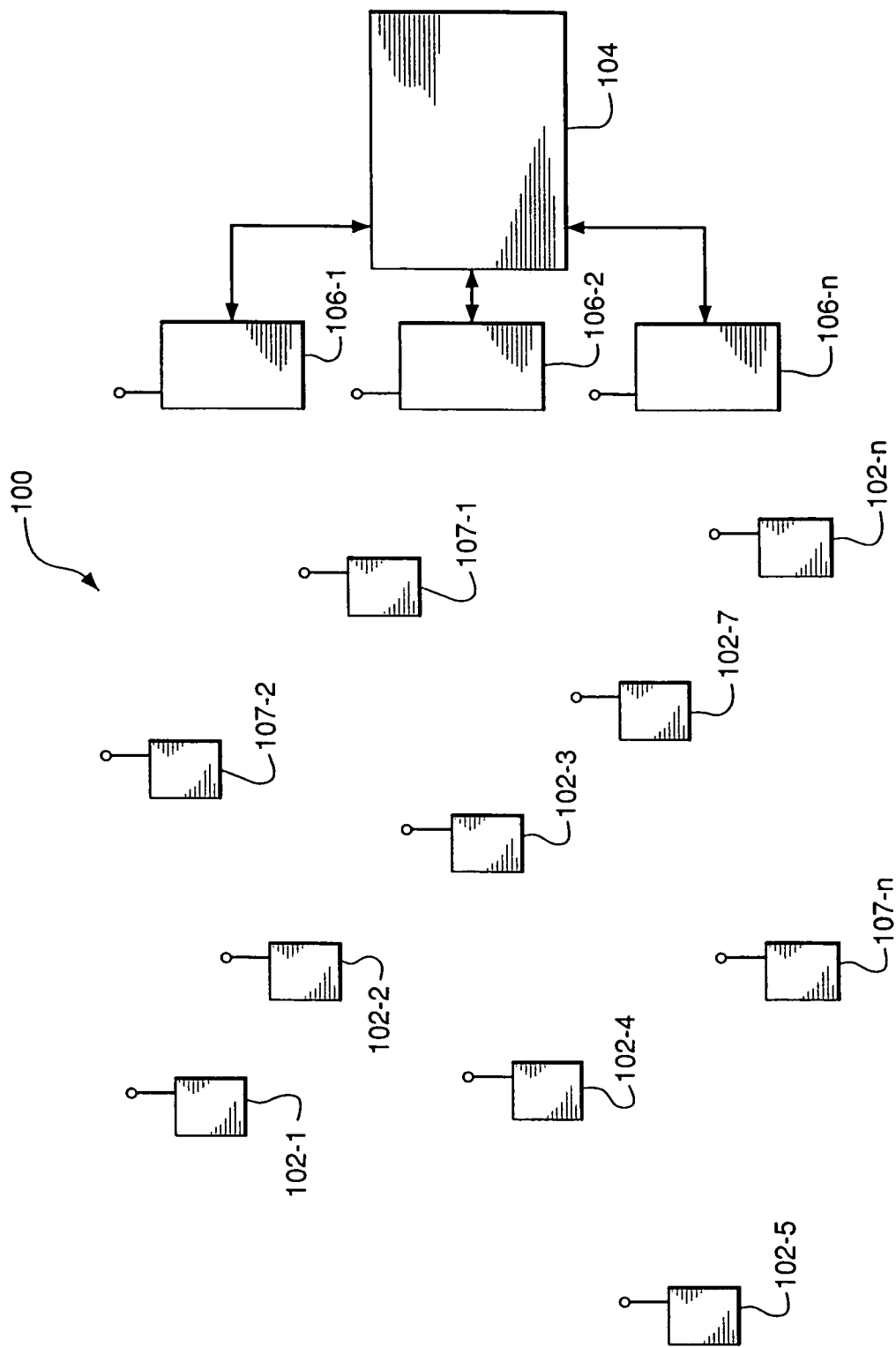
FIG. 1 is a block diagram of an example of an ad-hoc packet-switched wireless communications network employing a system and method for determining the mobility of nodes in the network according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as user terminals 102), and a fixed network 104 having a plurality of intelligent access points (IAPs) 106-1, 106-2, . . . , 106-n, for providing the user terminals 102 with access to the fixed network 104. The fixed network 104 includes, for example, a core local access network (LAN), and a plurality of servers and gateway routers, to thus provide the user terminals 102 with access to other networks, such as the public switched telephone network (PSTN) and the Internet.

The network 100 further includes fixed wireless routers 107-1 through 107-n, which act as routers for the user terminals 102-1 through 102-n and IAPs 106-1 through 106-n. The user terminals 102, IAPs 106 and fixed wireless routers 107 can be referred to as "nodes", with the user terminals 102 being referred to as "mobile nodes".

Figure 2:
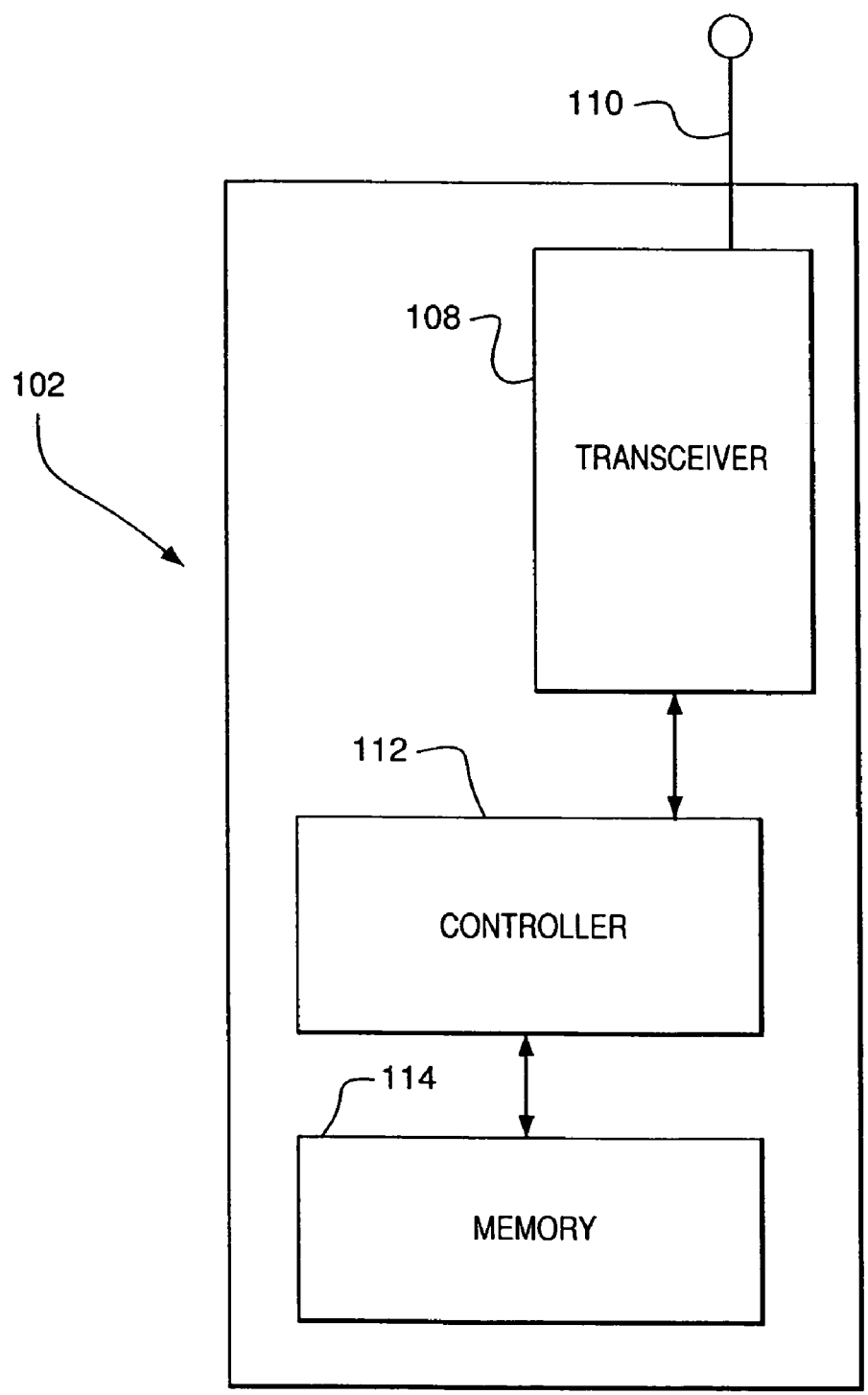
FIG. 2 is a block diagram illustrating an example of a user terminal employed in the network shown in FIG. 1.

As can be appreciated by one skilled in the art, the user terminals 102 are capable of communicating with each other directly, or via one or more other user terminals 102 operating as a router or routers for data packets being sent between user terminals 102, or via one or more IAPs 106 or fixed wireless routers 107, as described in U.S. Pat. No. 5,943,322 to Mayor and in U.S. Pat. Nos. 7,072,650 and 6,807,165, referenced above. Specifically, as shown in FIG. 2, each user terminal 102 includes a transceiver 108 which is coupled to an antenna 110 and is capable of receiving and transmitting signals, such as packetized data signals, to and from the user terminal 102, under the control of a controller 112. The packetized data signals can include, for example, voice, data or multimedia.

Each user terminal 102 further includes a memory 114, such as a random access memory (RAM), that is capable of storing, among other things, routing information pertaining to itself and other user terminals 102 in the network 100, and information pertaining to its own location, such as Geo-location information. It should be notes that the fixed wireless routers 107, as well as the IAPs 106, also include one or more transceivers 108, antennas 110, controllers 112 and memories 114, which can be similar to those discussed above.

The user terminals 102 exchange their respective routing information, referred to as routing advertisements or routing table information, with each other via a broadcasting mechanism periodically, for example, when a new user terminal 102 enters the network 100, or when existing user terminals 102 in the network 100 move. A user terminal 102 will broadcast its routing table updates, and nearby user terminals 102 will only receive the broadcast routing table updates if within radio frequency (RF) range of the broadcasting user terminal 102. For example, assuming that user terminals 102-1, 102-3 and 102-4, and fixed wireless router 107-2, are within the RF broadcast range of user terminal 102-2, when user terminal 102-2 broadcasts its routing table information, that information is received by user terminals 102-1, 102-3 and 102-4, and by fixed wireless router 107-2. However, if user terminals 102-5, 102-6 and 102-7 through 102-n, and the other wireless fixed routers 107 and IAPs 106 are out of the broadcast range, none of those user terminals, wireless fixed routers or IAPs will receive the broadcast routing table information from user terminal 102-2.

Each of the user terminals 102-1, 102-3 and 102-4 (as well as the fixed wireless routers 107 and IAPs 106, if any) that receive the routing table information from user terminal 102-2 can store all or a relevant portion of that routing table information in their respective memory 114. Typically, each user terminal 102 will perform a pruning operation to reduce the amount of routing table information that it stores in its memory 114 as can be appreciated by one skilled in the art. It is also noted that when a user terminal 102 broadcasts the routing table information to its neighboring user terminals 102, the user terminal 102 can include routing table information pertaining to some or all of its neighboring user terminals 102 that it has previously received from them and has stored in its memory 108. Accordingly, a user terminal 102 receiving the broadcast routing table information from another user terminal 102 also receives some information pertaining to the routing capabilities of the neighbors of that other user terminal 102.

It should also be noted that the IAPs 106 and fixed wireless routers 107 can exchange routing table information with other user terminals 102, IAPs 106 and fixed wireless routers 107 in a similar manner. The IAPs 106 and fixed wireless routers 107 can also perform the updating, storing and pruning operations discussed above.

An example of the manner in which user terminals 102 can communicate data packets to each other will now be described. Referring to FIG. 1, if user terminal 102-1 wishes to communicate with user terminal 102-7 in the ad-hoc network, the controller 112 of user terminal 102-1 can determine, based on the routing table information stored in memory 114 of user terminal 102-1, whether to send data packets along a particular path to user terminal 102-7. For example, if the controller 112 of user terminal 102-1 determines that the path including user terminal 102-2 is acceptable, then the controller 112 of user terminal 102-1 controls the transceiver 108 of user terminal 102-1 to send the data packets addressed for user terminal 102-7 to user terminal 102-2 over an appropriate channel as can be appreciated by one skilled in the art. Using similar decision making operations, the controller 112 of user terminal 102-2 can control the transceiver 108 of user terminal 102-2 to send the data packets to, for example, user terminal 102-3, whose transceiver 108 in turn is controlled by its respective controller 112 to send the data packets to the destination user terminal 102-7. The controllers 112 of user terminals 102-1, 102-2, and so on, can also determine whether to route packets through any of the fixed wireless routers 107 or IAPs 106 in a similar manner.

Accordingly, any user terminal 102 operating in a certain region of the network 100 can generally use any other user terminal 102 within that region as a router to route data packets to a destination user terminal 102. Moreover, the access points 106 and fixed wireless routers 107 can also operate as routers to route data packets between user terminals 102. For example, user terminal 102-3 can use access point 106-2 or fixed wireless router 107-1 to route data packets to a destination user terminal 102-7 if necessary or desirable.

As can be appreciated from the above, the nodes (i.e., user terminals 102, IAPs 106 and routers 107) in the network 100 use considerable available bandwidth not only to transmit data packets that they generate and to receive data packets addressed to them, but also to route data packets to other nodes. In addition, the nodes use bandwidth to share their routing information with other nodes as discussed above. Accordingly, it is desirable to minimize the rate at which the nodes share this routing information with other nodes in order to make available more bandwith for transmission of data packets throughout the network.

As discussed above, the IAPs 106 and fixed wireless routers 107 are always stationary. Therefore, the routing table information that these stationary nodes store does not change due to the movement of these nodes. Rather, their routing table information may change due to the mobility of the mobile nodes that, for example, have different fixed wireless routers 107 as their neighbors at any given time, and become affiliated and unaffiliated with certain IAPs 106 due to their mobility. Also, even though the mobile nodes (user terminals) 106 are indeed mobile, it should be noted that even these nodes spend large amounts of time in a stationary position, such as when a user is at home or at work. Accordingly, during these stationary periods, the routing table information for the mobile nodes also does not change due to their own movement, but rather, due to the movement of other mobile nodes in and out of their neighborhood of nodes.

However, at other times, such as when a user of a mobile node is traveling or commuting to and from work, the mobile node is, in fact, mobile. As discussed above, the node will typically change its neighboring nodes and IAP affiliation at some rate proportional to its mobility. For example, if the mobile node is moving rapidly, such as on a highway, the rate at which the mobile node changes it neighboring nodes and IAP affiliate may be high. In this event, the node will need to share its routing table information more frequently with other nodes because this information is changing more frequently. Also, the node will need to assess its location more frequently by performing Geo-location updates more frequently. However, if the mobile node is moving slowly in traffic or is in a sparsely populated area in which there are fewer other mobile and fixed nodes, the rate at which the node changes its neighboring nodes and IAP affiliation may not be as great. In this event, the node may not need to share its routing information as frequently because this information may not change as frequently. The node may also not need perform Geo-location updates as frequently.

The system and method according to an embodiment of the present invention therefore takes into account this large degree of variation in the mobility of a mobile node to adjust the rates at which the mobile node shares information, such as routing table information, with other nodes, and also adjusts the rate at which the mobile node performs Geo-location updates pertaining to its own position. That is, if it is determined that a particular node is stationary, then the information about that node, such as routing information, which it has previously shared with its neighbors is likely the same after a period of time, particularly if those neighbors are stationary as well. Therefore, the system and method controls the node to share this information with other nodes less frequently if the mobility of the node is small or if the node is stationary. On the other hand, if the mobility of the node is high, the system and method control the node to share this information with other neighboring nodes more frequently.

Figure 3:
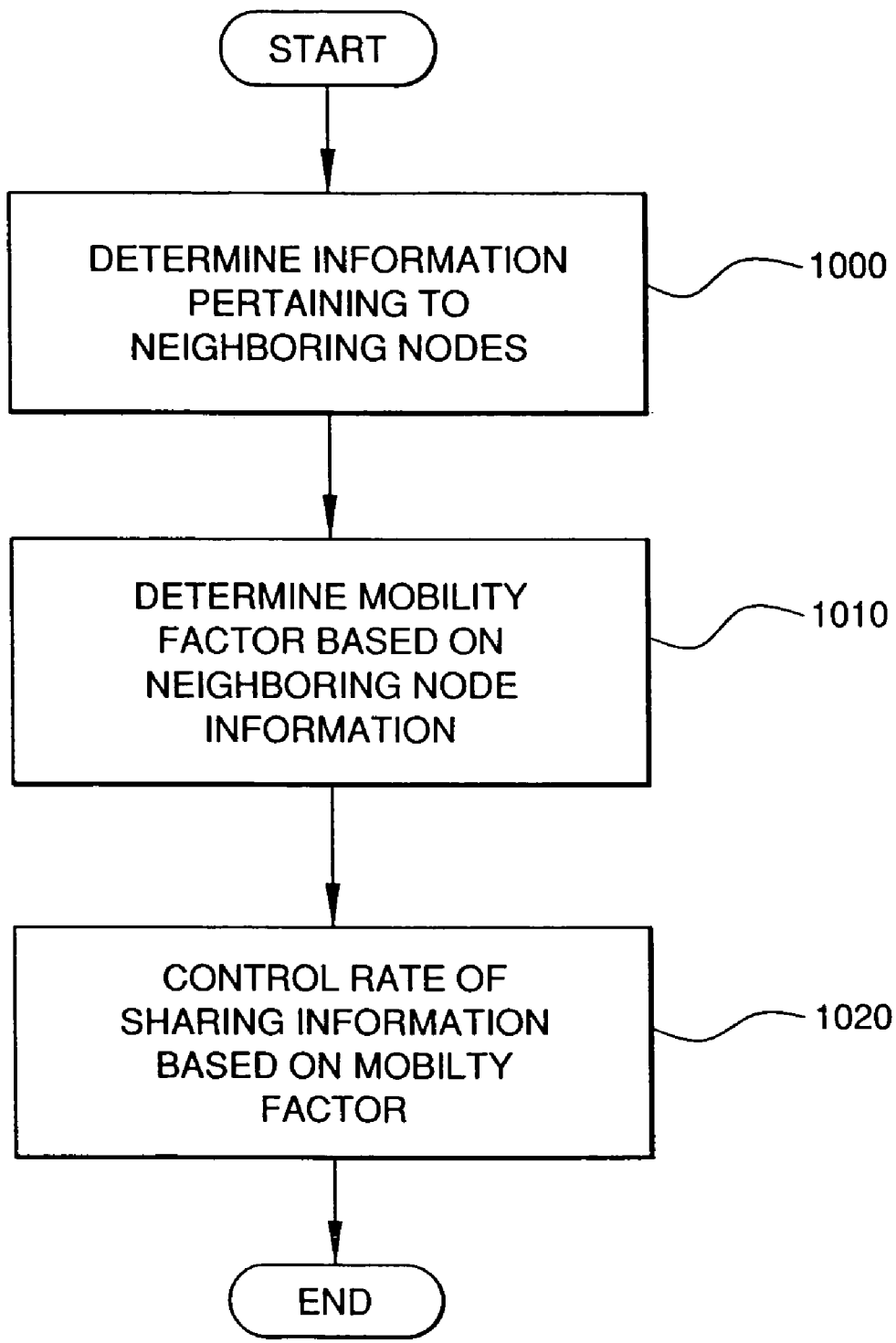
FIG. 3 is a flowchart showing an example of operations performed by a mobile node for determining a mobility factor of the mobile node and for adjusting information sharing by the mobile node based on this mobility factor in accordance with an embodiment of the present invention.

The system and method according to an embodiment of the present invention therefore determine a factor of mobility of a node in order to adjust the rate at which the node shares information with other nodes. In particular, because the IAPs 106 and fixed wireless routers 107 are always stationary, the system and method uses the location and rate of movement of a node with respect to these IAPs 106 and routers 107 to determine the mobility of a node, as will now be described with reference to the flowchart shown in FIG. 3.

As shown in step 1000, the system and method controls, for example, the controller 112 of a mobile node to keep track of each IAP 106 and fixed wireless router 107 within its RF transmission range. In doing so, the controller 112 monitors respective durations of time during which respective IAPs 106 and respective fixed wireless routers 107 have been within the node's transmission range. The controller 112 also monitors the approximate distance between the mobile node and these IAPs 106 and fixed wireless routers 107. The controller 112 can determine these distances based on a technique such as a measure of the exchange of request to send (RTS) and clear to send (CTS) messages between the node and respective IAPs 106 and fixed wireless routers 107, as described in a copending U.S. Pat. No. 6,768,730 of Eric A. Whitehill entitled "A System and Method for Efficiently Performing Two-Way Ranging to Determine the Location of a Wireless Node in a Communications Network", issued on Jul. 27, 2004, the entire contents of which being incorporated herein by reference. The controller 112 can also measure the distances between the node and IAPs 106 and fixed wireless routers 107 by using other techniques, such as by measuring the respective power levels at which the node receives signals from the respective IAPs 106 and respective fixed wireless routers 107, and, if available, respective data rates at which the respective IAPs 106 and wireless fixed routers 107 last used to communicate with the node, as can be appreciated by one skilled in the art.

Accordingly, based on all this information, if a set of fixed nodes (IAPs 106 and wireless fixed routers 107) have existed as neighbors of the mobile node for relatively long periods of time, it is determined that this node is stationary. However, if there is any notable change in these factors, including variations in the distances between the mobile node and the fixed nodes and the changing of fixed nodes in and out of the mobile node's list of known neighbors, the mobile node is determined to be mobile. The rate at which these events occur is therefore referred to as the mobility factor for the mobile node. The controller 112 of the mobile node can store this mobility factor, for example, in the node's memory 114, as indicated in step 1010. The mobility factor can be stored as, for example, a numerical value in which the minimum value is stationary, and the maximum value represents a maximum rate of movement that typically can be experienced by any mobile node.

In step 1020, the controller 112 can therefore control the rate at which the mobile node shares its information, such as routing information, with other nodes in the manner discussed above. That is, if the mobility factor is low, the controller 112 can control the node to send its information to its neighboring nodes less frequently. However, if the mobility factor is high or at maximum, the controller can control the node to send its information to its neighboring nodes more frequently, or at the highest rate.

Accordingly, because the rate at which the node shares this information is based on the rate of mobility of the node, the nodes are able to share their information with other nodes more economically from a bandwidth usage standpoint. Furthermore, the mobility factor of a node can also be used by other nodes to determine if this node may be an acceptable relayer of data packets for a neighboring node. The mobility factor of a node can further be used by other nodes to determine whether or not to consider this node in a routing decision. For example, if the mobility factor is high, the other nodes may determine that this node's routing information may be soon out of date and therefore, may these other nodes may refrain from using this node in their selected routing paths. The mobility factor can also enable the node to adjusting how quickly it needs to re-associate with a different LAP. In addition, if the mobility factor indicates that the node is stationary, the node can refrain from performing Geo-location updates, which can consume large amounts of bandwidth due to their required communication with other nodes, until the mobility factor indicates that the node has again become mobile.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A node, adapted for use in a wireless communications network and being capable of determining its mobility, said wireless communications network comprising a plurality of other nodes, at least some of which being stationary, said node comprising:

a transceiver, adapted to communicate or attempt to communicate with at least one of said stationary other nodes in said network; and a controller, adapted to determine a mobility factor of said node based on said communication or attempted communication with said at least one stationary other node, and being adapted to control a rate at which said transceiver sends information pertaining to said node to at least one of said other nodes in said network based on said mobility factor.

2. A node as claimed in claim 1, wherein:
said mobility factor represents a rate of mobility of said node.

3. A node as claimed in claim 2, wherein:
said rate at which said controller controls said transceiver to send said information is proportional to said rate of mobility.

4. A node as claimed in claim 1, wherein:
said communication by said transceiver with said at least one other stationary node enables said node to determine its distance to said at least one other stationary node.

5. A node as claimed in claim 1, wherein:
said attempted communication by said transceiver with said at least one other stationary node enables said node to determine whether said at least one other stationary node is a within a transmission range of said node.

6. A node as claimed in claim 1, wherein:
at least one of said stationary nodes includes a stationary router, adapted to route data packets which it receives that are addressed to other nodes to said other nodes.

7. A node as claimed in claim 1, wherein:
at least one of said stationary nodes includes an access point, adapted to provide said node and a said other node with access to at least one of another portion of said network and another network different from said network.

8. A node as claimed in claim 1, wherein:
said network includes an ad-hoc network.

9. A method of determining a mobility of a node, which is adapted for use in a wireless communications network, said wireless communications network comprising a plurality of other nodes, at least some of which being stationary, said method comprising:

controlling said node to communicate or attempt to communicate with at least one of said stationary other nodes in said network;

determining a mobility factor of said node based on said communication or attempted communication with said at least one stationary other node; and controlling a rate at which said node sends information pertaining to itself to at least one of said other nodes in said network based on said mobility factor.

10. A method as claimed in claim 9, wherein:
said mobility factor represents a rate of mobility of said node.

11. A method as claimed in claim 10, wherein:
said rate at which said rate controlling controls said node to send said information is proportional to said rate of mobility.

12. A method as claimed in claim 9, wherein:
said communication by said node with said at least one other stationary node enables said node to determine its distance to said at least one other stationary node.

13. A method as claimed in claim 9, wherein:
said attempted communication by said node with said at least one other stationary node enables said node to determine whether said at least one other stationary node is a within a transmission range of said node.

14. A method as claimed in claim 9, wherein:
at least one of said stationary nodes includes a stationary router, adapted to route data packets which it receives that are addressed to other nodes to said other nodes.

15. A method as claimed in claim 9, wherein:
at least one of said stationary nodes includes an access point, adapted to provide said node and a said other node with access to at least one of another portion of said network and another network different from said network.

16. A method as claimed in claim 9, wherein:
said network includes an ad-hoc network.

17. A computer-readable medium of instructions, adapted to determine a mobility of a node, which is adapted for use in a wireless communications network, said wireless communications network comprising a plurality of other nodes, at least some of which being stationary, said computer readable medium of instructions comprising:
 a first set of instructions, adapted to control said node to communicate or attempt to communicate with at least one of said stationary other nodes in said network;
 a second set of instructions, adapted to determine a mobility factor of said node based on said communication or attempted communication with said at least one stationary other node; and
 a third set of instructions, adapted to control a rate at which said node sends information pertaining to itself to at least one of said other nodes in said network based on said mobility factor.

18. A computer-readable medium of instructions as claimed in claim 17, wherein:
 said mobility factor represents a rate of mobility of said node.

19. A computer-readable medium of instructions as claimed in claim 18, wherein:
 said rate at which said third set of instructions controls said node to send said information is proportional to said rate of mobility.

20. A computer-readable medium of instructions as claimed in claim 17, wherein:
 a fourth set of instructions, adapted to determine a distance of said node to said at least one other stationary node based on said communication by said node with said at least one other stationary node.

21. A computer-readable medium of instructions as claimed in claim 17, wherein:
 a fifth set of instructions, adapted to determine whether said at least one other stationary node is a within a transmission range of said node based on said attempted communication by said node with said at least one other stationary node.

22. A computer-readable medium of instructions as claimed in claim 17, wherein:
 at least one of said stationary nodes includes a stationary router, adapted to route data packets which it receives that are addressed to other nodes to said other nodes.

23. A computer-readable medium of instructions as claimed in claim 17, wherein:
 at least one of said stationary nodes includes an access point, adapted to provide said node and a said other node with access to at least one of another portion of said network and another network different from said network.

24. A computer-readable medium of instructions as claimed in claim 17, wherein:
 said network includes an ad-hoc network.

* * * * *